United States Patent
O'Farrell et al.

(10) Patent No.: US 12,423,071 B2
(45) Date of Patent: Sep. 23, 2025

(54) PORTING AT LEAST ONE PROGRAMMING LANGUAGE PACKAGE TO A TARGET OPERATING SYSTEM PLATFORM

(71) Applicant: International Business Machines Corporation, Armonk, NY (US)

(72) Inventors: William Gerald O'Farrell, Markham (CA); Fateh Hyder, Ottawa (CA); Dustin Donald Ward, Lethbridge (CA); Mackenzie David Malainey, St. Albert (CA)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 18/101,427

(22) Filed: Jan. 25, 2023

(65) Prior Publication Data

US 2024/0248690 A1     Jul. 25, 2024

(51) Int. Cl.
*G06F 8/41*     (2018.01)
*G06F 8/30*     (2018.01)

(52) U.S. Cl.
CPC ............ *G06F 8/427* (2013.01); *G06F 8/37* (2013.01)

(58) Field of Classification Search
None
See application file for complete search history.

(56) References Cited

U.S. PATENT DOCUMENTS

| | | | | |
|---|---|---|---|---|
| 5,701,487 A | * | 12/1997 | Arbouzov | G06F 8/423 717/124 |
| 6,405,368 B1 | * | 6/2002 | Freyburger | G06F 8/41 717/102 |
| 6,542,167 B1 | * | 4/2003 | Darlet | G06F 9/44521 715/826 |
| 6,976,221 B2 | * | 12/2005 | Darlet | G06F 9/44521 715/765 |
| 8,028,279 B2 | | 9/2011 | Bonsteel et al. | |

(Continued)

OTHER PUBLICATIONS

Porting applications to z/OS. IBM Open Enterprise SDK for Go 1.17, Sep. 30, 2022. [3 printed pages] <https://www.ibm.com/docs/en/sdk-go-zos/1.17?topic=porting-applications-zos>.

*Primary Examiner* — Philip Wang
(74) *Attorney, Agent, or Firm* — Edward J. Wixted, III

(57) ABSTRACT

Techniques are described with regard to programming language adaptation to a target operating system platform. An associated method includes receiving at least one build parsing error consequent to compiling at least one current programming language package on the target operating system platform. Responsive to determining that there is no special override porting module corresponding to the at least one current programming language package, the method further includes porting the at least one current programming language package to the target operating system platform automatically by addressing at least one undefined symbol among the at least one build parsing error. Responsive to determining that there is at least one special override porting module corresponding to the at least one current programming language package, the method further includes porting the at least one current programming language package to the target operating system platform according to the at least one special override porting module.

19 Claims, 8 Drawing Sheets

(56) References Cited

U.S. PATENT DOCUMENTS

| | | | | |
|---|---|---|---|---|
| 8,122,440 | B1* | 2/2012 | Lentini | G06F 8/433 |
| | | | | 717/148 |
| 8,468,516 | B1* | 6/2013 | Chen | G06F 8/656 |
| | | | | 717/169 |
| 2001/0016881 | A1* | 8/2001 | Sanchez, II | G06F 8/76 |
| | | | | 719/315 |
| 2003/0009747 | A1 | 1/2003 | Duran | |
| 2003/0225935 | A1 | 12/2003 | Rivard et al. | |
| 2004/0255291 | A1* | 12/2004 | Sierer | G06F 8/61 |
| | | | | 717/174 |
| 2007/0130565 | A1* | 6/2007 | Fan | G06F 8/54 |
| | | | | 717/173 |
| 2008/0005719 | A1* | 1/2008 | Morris | G06F 8/41 |
| | | | | 717/100 |
| 2008/0127174 | A1* | 5/2008 | Johnson | G06F 8/658 |
| | | | | 717/174 |
| 2015/0033202 | A1* | 1/2015 | Wilson | G06F 8/76 |
| | | | | 717/106 |
| 2015/0347128 | A1* | 12/2015 | Frenkiel | G06F 8/36 |
| | | | | 717/123 |
| 2019/0121621 | A1* | 4/2019 | Aggarwal | G06N 20/00 |
| 2022/0300264 | A1* | 9/2022 | Rose | G06F 9/4498 |
| 2022/0365778 | A1* | 11/2022 | Jia | G06F 8/75 |
| 2024/0070289 | A1* | 2/2024 | Wareus | H04L 43/0817 |
| 2025/0060960 | A1* | 2/2025 | Huang | G06F 8/76 |

* cited by examiner

PORTING AT LEAST ONE PROGRAMMING LANGUAGE PACKAGE TO A TARGET OPERATING SYSTEM PLATFORM

BACKGROUND

The various embodiments described herein generally relate to programming language adaptation. More specifically, the various embodiments relate to porting at least one programming language package to a target operating system platform.

SUMMARY

The various embodiments described herein provide techniques of programming language adaptation to a target operating system platform. An associated computer-implemented method includes receiving at least one build parsing error consequent to compiling at least one current programming language package on the target operating system platform. Responsive to determining that there is no special override porting module corresponding to the at least one current programming language package, the method further includes porting the at least one current programming language package to the target operating system platform automatically by addressing at least one undefined symbol among the at least one build parsing error. Responsive to determining that there is at least one special override porting module corresponding to the at least one current programming language package, the method further includes porting the at least one current programming language package to the target operating system platform according to the at least one special override porting module.

In an embodiment, the method further includes configuring an action database associated with each of the at least one current programming language package, wherein the action database of a certain package among the at least one current programming language package comprises respective pre-edit hashes of source code files of the certain package, post-edit hashes of source code files of the certain package, and a listing of other packages ported consequent to porting the certain package. Optionally, the method further includes downloading at least one tool module associated with the at least one current programming language package via a programming language technique associated with tool installation, and importing the at least one tool module to the target operating system platform. Optionally, the method further includes, responsive to receiving a user application interface command requesting porting analysis with respect to a certain package among the at least one current programming language package, initializing an interactive mode in order to display to at least one user application interface any porting modification made to the certain package and any alternative porting option. Optionally, the method further includes, responsive to determining that at least one manual code change is required for a certain package among the at least one current programming language package, un-porting the certain package.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
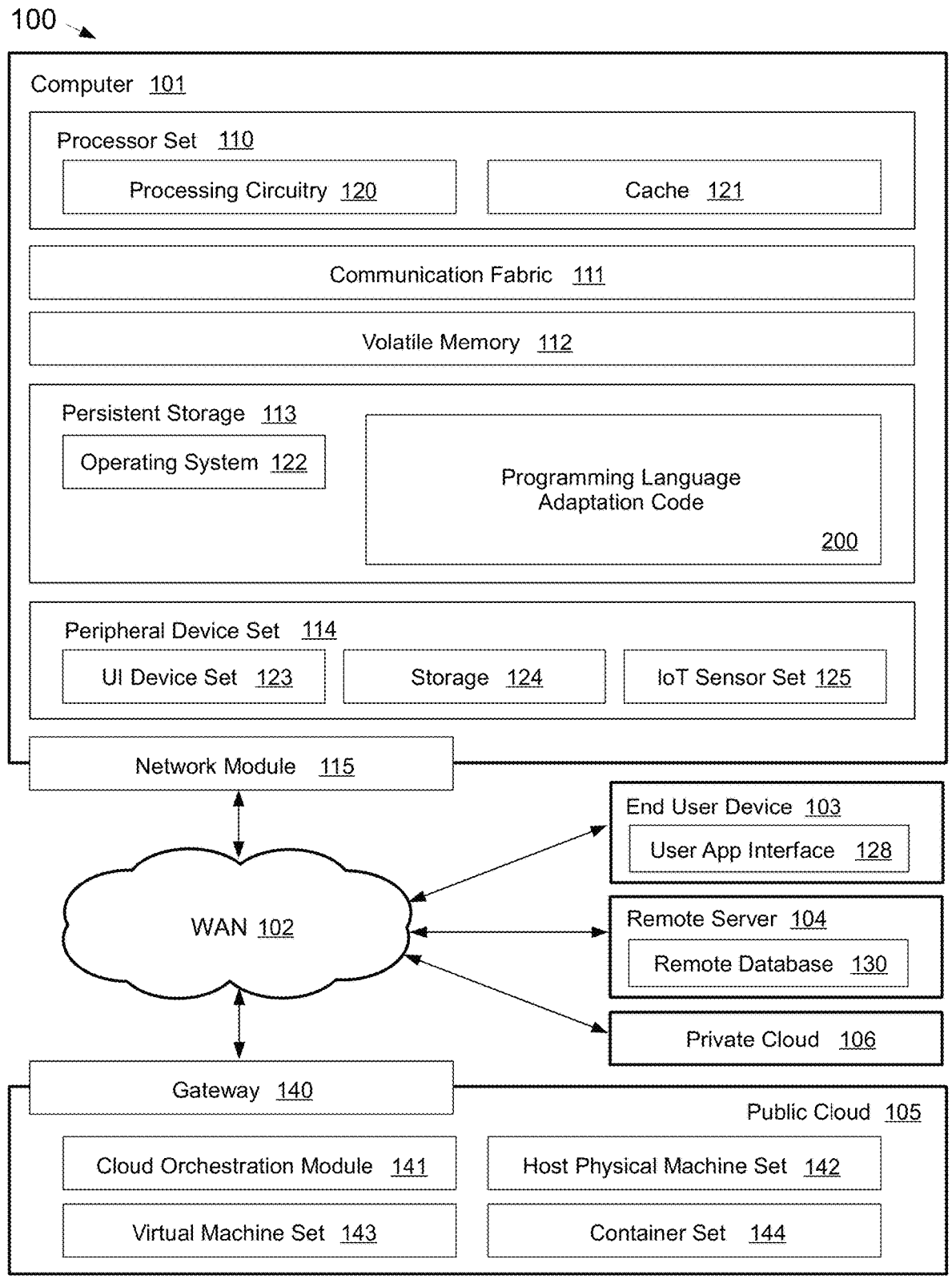
FIG. 1 illustrates a computing environment, according to one or more embodiments.

The various embodiments described herein are directed to programming language adaptation to a target operating system platform. The various embodiments adapt at least one current programming language package to the target operating system platform by attempting to compile the at least one current programming language package and then porting the at least one programming language package to the target operating system platform by addressing any undefined symbol among any build parsing error received consequent to the compile attempt. An undefined symbol may be an export symbol associated with (e.g., included within or otherwise related to) at least one export programming language package dependent on the at least one current programming language package, a local symbol internal to the at least one current programming language package, or an import symbol associated with (e.g., included within or otherwise related to) at least one import programming language package on which the at least one current programming language package depends. In certain instances, as further described herein, one or more of the at least one import programming language package on which the at least one current programming language package depends are ported along with the at least one current programming language package. Accordingly, in addition to addressing local symbols specifically associated with the at least one current programming language package, the various embodiments address export symbols or import symbols associated with programming language packages having respective dependency relationships with the at least one current programming language package.

The various embodiments described herein have advantages over conventional techniques. The various embodiments improve computer technology by facilitating automatic porting of programming language packages to address build failures upon a target operating system platform for which the packages are not pre-adapted. Specifically, the various embodiments provide steps to address build parsing errors associated with programming language adaptation to such target operating system platform. Automatic porting includes techniques for addressing undefined symbols, including export symbols, local symbols, and/or import symbols, among build parsing errors. Additionally, the various embodiments improve computer technology by enabling porting of programming language packages via special override in certain scenarios. Furthermore, the various embodiments improve computer technology by enabling un-porting of certain packages among programming language packages in scenarios in which manual code changes are required. Further still, the various embodiments improve computer technology by enabling an interactive mode to display to at least one user application interface any porting modification made responsive to a user command requesting porting analysis. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given computer program product claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Particular embodiments describe techniques relating to programming language adaptation to a target operating system platform via porting. However, it is to be understood that the techniques described herein may be adapted to a variety of purposes in addition to those specifically described herein. Accordingly, references to specific embodiments are included to be illustrative and not limiting.

Computing environment 100 includes an example of an environment for the execution of at least some of the computer code involved in performing the inventive methods, such as programming language adaptation code 200. In addition to programming language adaptation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and programming language adaptation code 200, as identified above), peripheral device set 114 (including user interface (UI) device set 123, storage 124, and Internet of Things (IoT) sensor set 125), and network module 115. EUD 103 includes an user application interface 128. User application interface 128 interfaces with one or more application aspects associated with programming language adaptation code 200. User application interface 128 is representative of a single interface or multiple interfaces. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Additionally or alternatively to being connectively coupled to public cloud 105 and private cloud 106, computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories typically are organized into multiple levels depending upon relative proximity to the processing circuitry. Alternatively, some, or all, of the cache 121 for processor set 110 may be located "off chip". In some computing environments, processor set 110 may be designed for working with qubits and performing quantum computing.

Computer readable program instructions typically are loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in programming language adaptation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but additionally or alternatively volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and rewriting of data. Some familiar forms of persistent storage include magnetic disks and solid state storage devices. Operating system 122 may take several forms, such as various known proprietary operating systems or open source Portable Operating System Interface-type operating systems that employ a kernel. Programming language adaptation code 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods typically can be downloaded to computer 101 from an external computer or external storage device through a network adapter card or network interface included in network module 115.

Wide area network (WAN) 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation typically would be communicated from network module 115 of computer 101 through WAN 102 to EUD 103. In this way, EUD 103 can display, or otherwise present, the recommendation to an end user, e.g., via user application interface 128. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, such historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. Public cloud 105 optionally offers infrastructure as a service (IaaS), platform as a service (PaaS), software as a service (SaaS), and/or other cloud computing services. The computing resources provided by public cloud 105 are typically implemented by virtual computing environments (VCEs) that run on various computers making up the computers of host physical machine set 142, which is the universe of physical computers in and/or available to public cloud 105. The VCEs typically take the form of virtual machines from virtual machine set 143 and/or containers from container set 144. It is understood that such VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container only can use the contents of the container and devices assigned to the container, a feature which is known as containerization.

Private cloud 106 is similar to public cloud 105, except that the computing resources are only available for use by a single enterprise. While private cloud 106 is depicted in FIG. 1 as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In the context of the various embodiments described herein, components of computing environment 100, including aspects of programming language adaptation code 200, provide, or are configured to provide, any entity associated with programming language adaptation advance notice of any personal data collection. Components of computing environment 100 further provide, or further are configured to provide, any affected entity an option to opt in or opt out of any such personal data collection at any time. Optionally, components of computing environment 100 further transmit, or further are configured to transmit, notification(s) to any affected entity each time any such personal data collection occurs and/or at designated time intervals.

Figure 2:
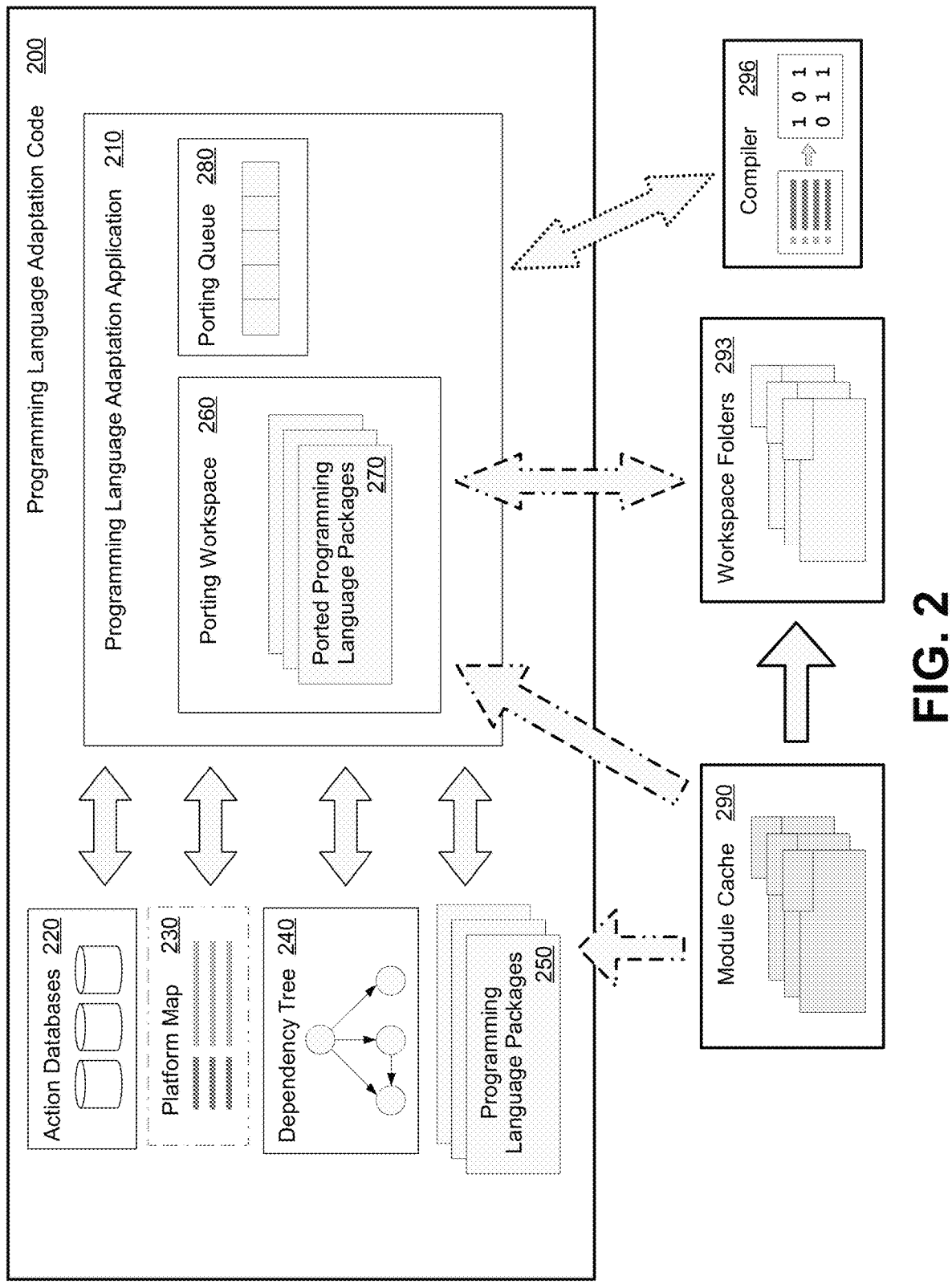
FIG. 2 illustrates an example schematic diagram including programming language adaptation code, according to one or more embodiments.

FIG. 2 illustrates an example schematic diagram including programming language adaptation code 200. Programming language adaptation code 200 includes programming language adaptation application 210. Programming language adaptation code 200 further includes action databases 220, platform map 230, dependency tree 240, and programming language packages 250. Programming language adaptation application 210 includes application porting workspace 260, which in turn includes ported programming language packages 270, and porting queue 280. Ported programming language packages 270 include packages recently ported/adapted, currently being ported/adapted, and/or about to be ported/adapted within application porting workspace 260. Ported programming language packages 270 optionally includes a subset of programming language packages 250 copied to application porting workspace 260 for porting or adaptation. In the context of the various embodiments, action databases 220 store porting activity information associated with programming language packages 250, including porting activity information associated with ported programming language packages 270. Platform map 230 associates operating system platforms with various source code files associated with programming language packages 250, including various source code files associated with ported programming language packages 270. Dependency tree 240 includes a data structure that stores prioritization relationships with respect to programming language packages 250 and optionally ported programming language packages 270, such prioritization based upon direct dependency hierarchy. Dependency tree 240 is included to be representative of a single dependency tree or multiple dependency trees. The nodes and directed edges of dependency tree 240 as depicted are provided for example purposes only and may vary based upon a given package prioritization scenario. Porting queue 280 is a data structure that orders packages among ported programming language packages 270 for purposes of porting priority based upon dependency, e.g., in accordance with porting prioritization as determined via dependency tree 240.

Aspects of programming language adaptation code 200, including certain modules associated with programming language packages 250 and certain modules associated with ported programming language packages 270, are copied or otherwise accessed from module cache 290, which includes a protected, non-modifiable version of programming language packages. Aspects of programming language adaptation code 200 further are copied or otherwise accessed from, or copied or otherwise transferred to, workspace folders 293. Workspace folders 293 store aspects of ported programming language packages 270 and contents associated therewith, e.g., via a folder hierarchy including various files. Compiler 296 compiles and otherwise processes programming language packages, including ported programming language packages 270 adapted by programming language adaptation application 210, for build upon at least one platform.

Figure 3:
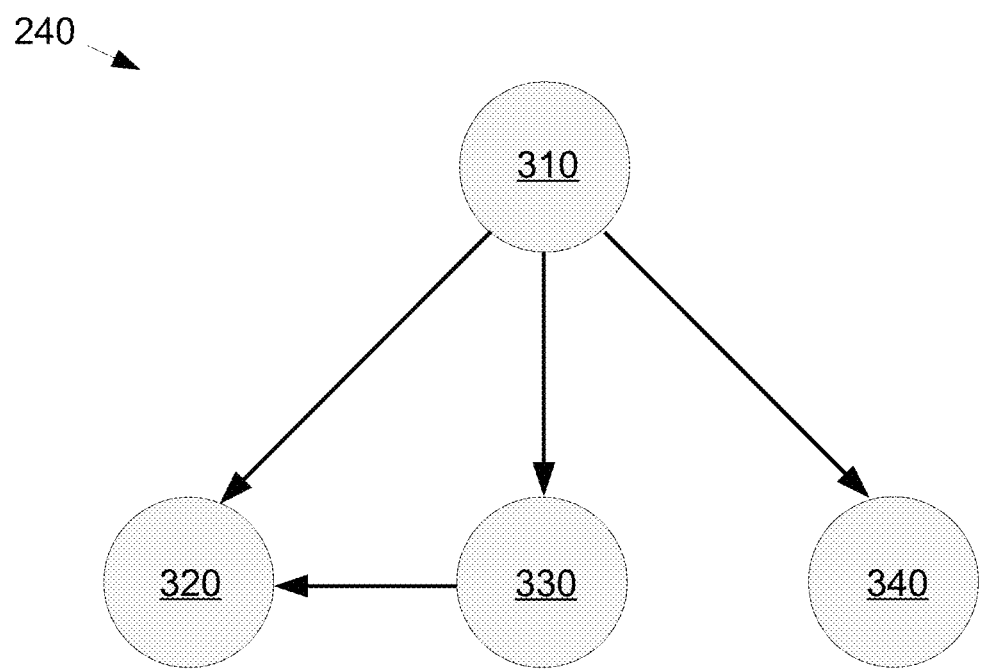
FIG. 3 illustrates an example dependency tree, according to one or more embodiments.

FIG. 3 illustrates an example embodiment of dependency tree 240. Dependency tree includes respective programming language packages 310, 320, 330, and 340. Package 310 depends on each of packages 320, 330, and 340, as indicated by directed arrows respectively from package 310 to package 320, from package 310 to package 330, and from package 310 to package 340. Furthermore, package 330 depends on package 320, as indicated by a directed arrow from package 330 to package 320.

Figure 4:
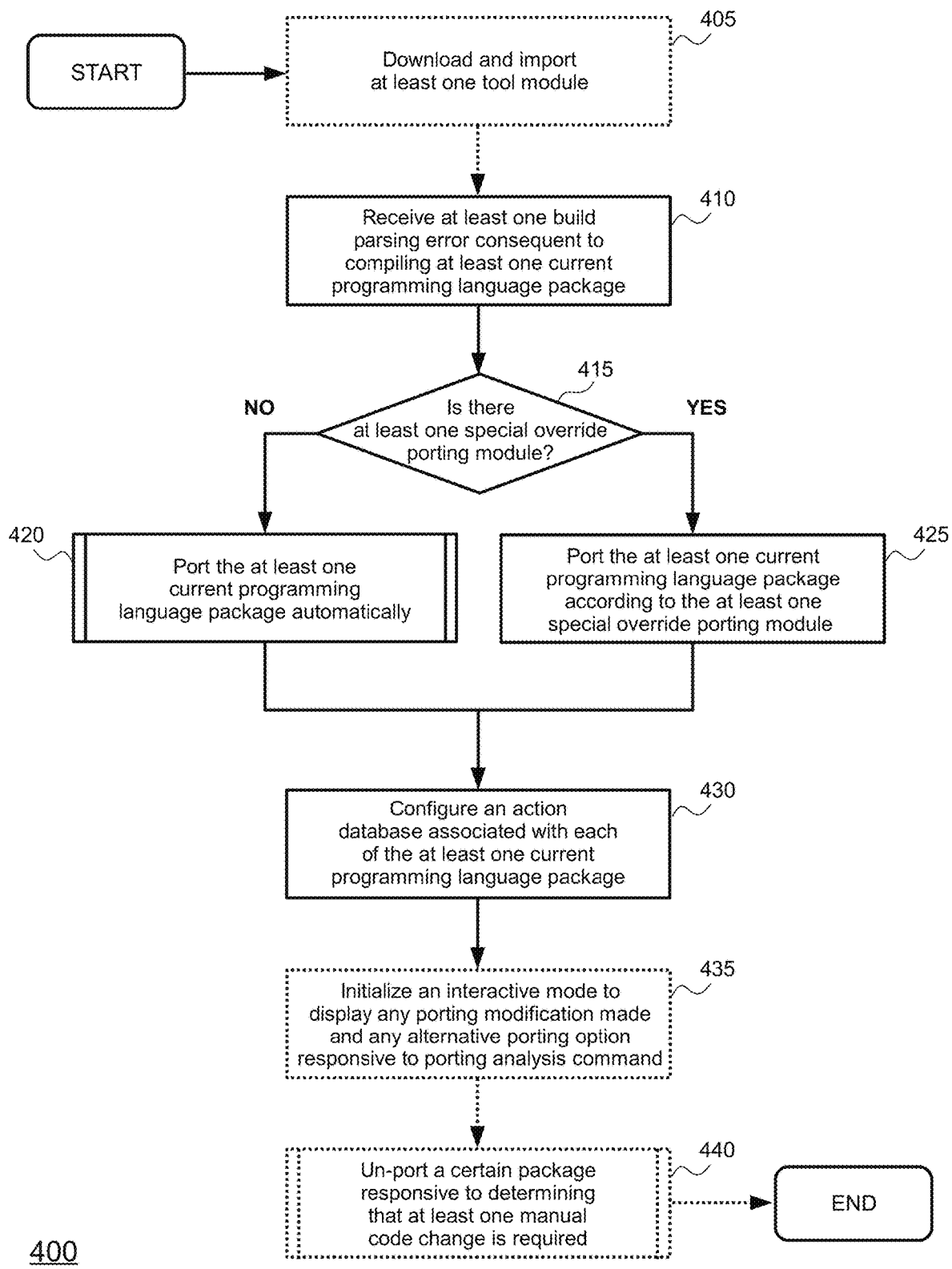
FIG. 4 illustrates a method of adapting a programming language to a target operating system platform, according to one or more embodiments.

FIG. 4 illustrates a method 400 of adapting a programming language to a target operating system platform. One or more steps associated with the method 400 and the other methods described herein optionally are carried out via programming language adaptation code in a computing environment (e.g., via programming language adaptation code 200 in computing environment 100). A programming language adaptation application (e.g., programming language adaptation application 210 in programming language adaptation code 200), hereinafter referred to as an adaptation application, facilitates adaptation of at least one current programming language package to the target operating system platform according to the method 400 and related methods described herein. According to the method 400 and related methods, the programming language adaptation application optionally receives programming language code adapted for use on a platform associated with a source operating system (e.g., operating system 122) and adapts such programming language code for use on the target operating system platform.

According to certain embodiments, the programming language to be adapted in the context of the method 400 and related methods is a procedural, statically-typed programming language, e.g., Go programming language. According to alternative embodiments, the programming language to be adapted is an object-oriented programming language. According to alternative embodiments, the programming language to be adapted is a dynamically-typed programming language. In the context of the various embodiments, a programming language package includes a set of related source code files associated with the programming language to be ported to the target operating system platform. In the context of the various embodiments, a platform is combination of an operating system and underlying architecture that interfaces between operating system software and firmware associated with underlying physical or virtualized hardware.

The method 400 begins at optional step 405, where the adaptation application downloads at least one tool module associated with the at least one current programming language package (e.g., among ported programming language packages 270) via a programming language technique associated with tool installation and imports the at least one tool module to the target operating system platform. Step 405 is optional, since the adaptation application only executes tool module download and import in scenarios in which one or more tools are required. In an embodiment, the adaptation application downloads and installs the at least one tool module responsive to receiving a tool installation request. Optionally, the adaptation application receives the tool installation request from at least one user application interface associated with the adaptation application (e.g., user application interface 128). Optionally, the at least one user application interface is associated with an end user device communicably coupled to the adaptation application (e.g., EUD 103) via a network (e.g., WAN 102). The at least one user application interface includes a graphical user interface (GUI), a command line interface (CLI), and/or a sensory interface configured to discern and process user sound/voice commands and/or user gestures. In a related embodiment, the at least one user application interface is associated with a code developer or a file system administrator. In the context of the various embodiments, the adaptation application stores porting data, including tool-related data, associated with the at least one current programming language package in at least one workspace folder associated with the target operating system platform (e.g., among workspace folders 293). In a related embodiment, one or more of the at least one workspace folder specifically are associated with porting the at least one current programming language package and any related dependent packages to the target operating system platform. In a further embodiment, the adaptation application performs porting tasks within an application porting workspace (e.g., application porting workspace 260). The application porting workspace processes source code files associated with the at least one current programming language package (and optionally dependent programming language packages) stored in the at least one workspace folder.

In an embodiment, the adaptation application imports the at least one tool module to the target operating system platform per step 405 by cloning the at least one tool module in its entirety to the at least one workspace folder. In an additional embodiment, the at least one tool module includes at least one source code file associated with at least one tool to be built and installed in association with the at least one current programming language package and/or at least one other programming language package to be ported to the target operating system platform. In a further embodiment, responsive to determining that the at least one tool module is not locally accessible, the adaptation application accesses the at least one tool module remotely via a remote server file system (e.g., accessed via remote server 104) in order to complete download of associated tool source code files.

At step 410, the adaptation application receives at least one build parsing error consequent to compiling the at least one current programming language package on the target operating system platform. In an embodiment, the compilation is completed via a compiler (e.g., compiler 296) configured to compile code of the programming language in which the at least one current programming language package is written, e.g., a Go compiler configured to compile Go code. In an additional embodiment, the at least one build parsing error includes an error associated with building procedural, statically-typed programming language aspects, e.g., a Go-build error. In a further embodiment, the at least parsing error includes a build error arising from compilation code calling C code, e.g., CGO compilation code. In a further embodiment, a listing of build parsing errors encountered for each package among the at least one current programming language package is output by the compiler to a STDERR stream, which is a standard stream to which build errors are sent. In an alternative embodiment, a listing of build parsing errors encountered for each package is output by the compiler to an in-memory listing of build errors, optionally represented by a data structure.

Prior to compilation, the compiler preprocesses the at least one current programming language package for compiling by identifying and addressing at least one pre-build parsing error associated with the at least one current programming language package. Examples of pre-build parsing errors, which are related to one or more modules associated with the at least one current programming language package, include an out-of-date checksum cache for modules, an out-of-date vendor directory, or an out-of-date module file. Pre-build parsing errors generally require running only a single fix command. The adaptation application automatically executes the applicable command(s) to fix the at least one pre-build parsing error and allow the build preprocessing to proceed. In an embodiment, a listing of pre-build parsing errors encountered for each package is output by the compiler to the STDERR stream. In an alternative embodiment, a listing of pre-build parsing errors encountered for each package is output by the compiler to an in-memory listing of pre-build errors, optionally represented by a data structure.

At step 415, the adaptation application determines whether there is at least one special override porting module corresponding to the at least one current programming language package. Responsive to determining that there is no special override porting module corresponding to the at least one current programming language package, at step 420 the adaptation application automatically ports the at least one current programming language package to the target operating system platform by addressing at least one undefined symbol among the at least one build parsing error received at step 410. In the context of the various embodiments, porting automatically entails addressing each of the at least one undefined symbol in accordance with predefined steps further described herein with respect to FIGS. 5A-5B and FIG. 6. In the context of the various embodiments, an undefined symbol is a programming language constant, type definition (e.g., class definition or struct definition), function definition, or variable definition that is unrecognized by the target operating system platform. For instance, in the context of the Go programming language, an undefined symbol is a Go-associated constant, type definition, function definition, or variable definition. An undefined symbol among the at least one undefined symbol may pertain to an export symbol configured for export to at least one export programming language package (e.g., among programming language packages 250) dependent on the at least one current programming language package, a local symbol internal to the at least one current programming language package, or an import symbol configured for import from at least one import programming language package (e.g., among programming language packages 250) on which the at least one current programming language package depends. In a further embodiment, the adaptation application addresses each of the at least one undefined symbol as a blacklisted symbol to be addressed via source code file retagging. As further described herein, the adaptation application retags each of the at least one undefined symbol either by adapting at least one source code file including the undefined symbol for a build configuration responsive to determining no syntax error during the retagging process or by excluding from any build configuration the at least one source code file responsive to determining at least one syntax error during the retagging process. Additionally or alternatively, the adaptation application addresses an import symbol among the at least one undefined symbol as a blacklisted symbol to be addressed through use of a replacement profile configured to replace the import symbol with an alternate value. A method of porting the at least one current programming language package to the target operating system platform automatically in accordance with step 420 is described with respect to FIGS. 5A-5B.

Responsive to determining that there is at least one special override porting module corresponding to the at least one current programming language package, at step 425 the adaptation application ports the at least one current programming language package to the target operating system platform according to the at least one special override porting module. The at least one special override porting module is configured to address all or a subset of the at least one build parsing error received at step 410, including one or more of the at least one undefined symbol. In the context of the various embodiments, a module includes a plurality of packages associated to accomplish one or more programming language objectives. In the context of the various embodiments, a special override porting module includes packages having code elements designed to replace all or a subset of aspects of the at least one current programming language package. Additionally or alternatively, a special override porting module includes packages having code elements designed to replace all or a subset of aspects of at least one package having at least one dependency relationship with the at least one current programming language package, e.g., at least one export programming language package dependent on the at least one current programming language package or at least one import programming language package on which the at least one current programming language package depends. In the context of the various embodiments, an owning module is a code module to which a certain programming language package belongs. A certain package belongs only to a single owning module. In an embodiment, each of the at least one current programming language package belongs to a single owning module. In an alternative embodiment, programming language packages among the at least one current programming language package respectively belong to different owning modules.

In an embodiment, porting the at least one current programming language package according to the at least one special override porting module per step 425 includes replacing at least one owning module associated with the at least one current programming language package in its entirety (all packages, service codes, etc.), thus completely preempting automatic porting according to step 420.

According to such embodiment, the adaptation application immediately clones in its entirety at least one modified owning module associated with the at least one current programming language package that incorporates hard coded changes associated with adaptation to the target operating system platform and subsequently submits the at least one modified owning module to the compiler for rebuilding. In a related embodiment, the adaptation application applies hard coded changes associated with the at least one modified owning module based upon at least one community port. In the context of the various embodiments, a community port includes known porting elements accessed from a coding community. Such coding community optionally is internal to an organization or alternatively is publicly accessible. Optionally, the adaptation application tracks known community ports.

In an alternative embodiment, porting the at least one current programming language package according to the at least one special override porting module per step 425 includes applying a patch file to the at least one current programming language package. The adaptation application creates a patch file by determining whether patch code exists in at least one community port. Additionally or alternatively, the adaptation application creates a patch file by determining whether patch code for adaptation to the target operating system platform exists in a subsequent code version associated with the at least one current programming language package. Responsive to determining that patch code exists in a subsequent code version, the adaptation application optionally applies the patch code of the subsequent code version per step 425 in order to address all or a subset of the at least one build parsing error. Additionally or alternatively, the adaptation application patches source code among the at least one current programming language package using a diff patch file created from an original version of the at least one current programming language package and a manually ported version of the at least one current programming language package created for manual adaptation to the target operating system platform. The diff patch file catalogues changes between the original version and the manually ported version. The manually ported version is a version originally ported manually, e.g., by at least one user associated with porting to the target operating system platform. The adaptation application applies the diff patch file to the original version of the at least one current programming language package to automatically recreate the manually ported version of the at least one current programming package for the target operating system platform. Optionally, responsive to determining that the patch file does not resolve each of the at least one build parsing error, the adaptation application attempts to resolve any remaining build parsing error via automatic porting in accordance with step 420.

In an embodiment, the at least one special override porting module addresses porting the at least one current programming language package responsive to determining that the at least one current programming language package requires one or more modules that no longer are actively maintained or updated. In a further embodiment, the at least one special override porting module addresses porting the at least one current programming language package responsive to determining that the at least one current programming language package is part of at least one module and/or has at least one dependency relationship with at least one module that is non-portable (i.e., unable to be ported) via the automatic porting process described with respect to step 420.

At step 430, the adaptation application configures an action database associated with each of the at least one current programming language package (e.g., among action databases 220). In an embodiment, the adaptation application stores an action database associated with each of the at least one current programming language package in the at least one workspace folder. The action database of a certain package among the at least one current programming language package includes respective pre-edit hashes of source code files of the certain package, respective post-edit hashes of source code files of the certain package, and a listing of other packages ported consequent to porting the certain package. The respective pre-edit hashes of source code files of the certain package include hashes of source code files of the certain package prior to editions made consequent to porting the package. The respective post-edit hashes of source code files of the certain package include hashes of source code files of the certain package subsequent to editions made consequent to porting the package. Accordingly, the adaptation application completes post-edit hashes subsequent to porting the package. In an embodiment, the action database of the certain package further includes a listing of source code files associated with the certain package that were edited. In an additional embodiment, an index file stored at a root of the at least one workspace folder includes a listing of packages among the at least one current programming language package that have an action database. In a further embodiment, responsive to identifying a subsequent porting operation to be completed, the adaptation application determines whether any package to be ported consequent to the subsequent porting operation has an associated action database. Responsive to determining that any package to be ported consequent to the subsequent porting operation has an associated action database, the adaptation application adds action database information to porting requirements associated with any such package. In a further embodiment, the adaptation application updates an action database associated with each of the at least one current programming language package consequent to automatic porting at step 420. In an alternative embodiment, the adaptation application updates an action database associated with each of the at least one current programming language package consequent to special override porting at step 425.

At optional step 435, responsive to receiving a user application interface command requesting porting analysis with respect to a certain package among the at least one current programming language package, the adaptation application initializes an interactive mode in order to display to the at least one user application interface any porting modification made to the certain package and any alternative porting option. Step 435 is optional, since the adaptation application only initializes the interactive mode responsive to receiving a user application interface command requesting porting analysis. In an embodiment, responsive to determining presence of an action database associated with the certain package, the adaptation application displays to the user, via the at least one user application interface associated with the adaptation application, a listing of any edited source code file of the certain package and porting actions made with respect to any such edited source code file. In a further embodiment, a porting modification with respect to step 435 is a modification made to one or more of the at least one current programming language package consequent to automatic porting at step 420. In an alternative embodiment, a porting modification is a modification made to one or more of the at least one current programming language package consequent to special override porting at step 425.

At optional step 440, responsive to determining that at least one manual code change is required for a certain package among the at least one current programming language package, the adaptation application un-ports the certain package. Step 440 is optional, since the adaptation application only un-ports responsive to determining that at least one manual code change is required. In an embodiment, the adaptation application un-ports the certain package according to a scenario in which the certain package is ported automatically at step 420. In an alternative embodiment, the adaptation application un-ports the certain package according to a scenario in which the certain package is ported consequent to special override porting at step 425. In a further embodiment, the certain package un-ported per step 440 is the same certain package analyzed in interactive mode at step 435. Alternatively, the certain package un-ported per step 440 is a different package from the certain package analyzed in interactive mode at step 435. A method of un-porting the certain package according to step 440 is described with respect to FIG. 7.

In an alternative embodiment, the adaptation application completes applicable steps of the method 400 and related methods with respect to porting the at least one current programming language package to multiple target operating system platforms. In a further alternative embodiment, the adaptation application completes applicable steps of the method 400 and related methods with respect to porting the at least one current programming language package to multiple versions of a single target operating system platform, e.g., multiple versions of the target operating system platform as described in the context of the method 400 and related methods. In an additional embodiment, the adaptation application repeats applicable steps associated with the method 400 and related methods until all programming language packages associated with a target build are adapted to the target operating system platform, the target build comprising each of the at least one current programming language package along with any dependent programming language package necessary for porting the at least one current programming language package.

Figure 5A:
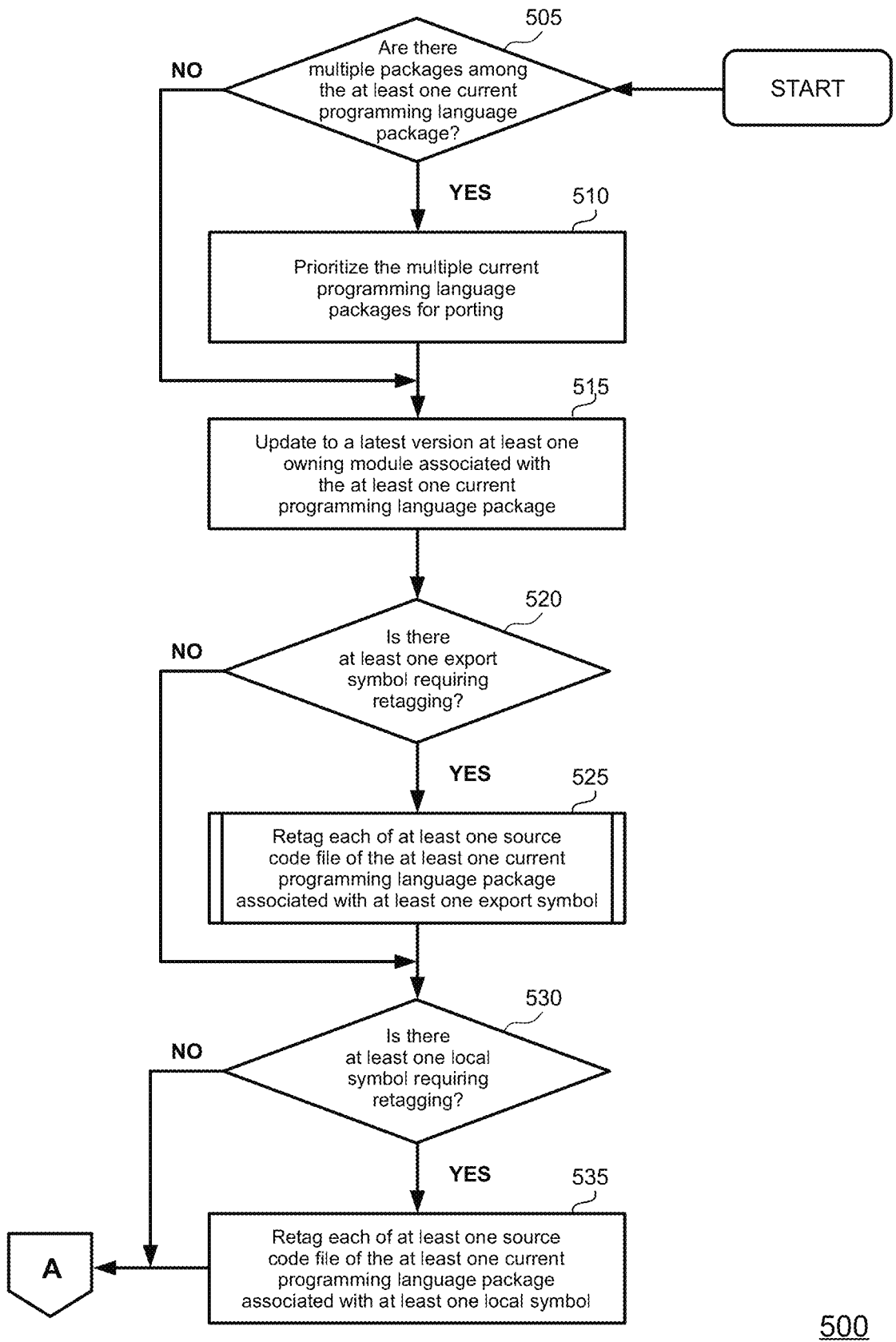
FIGS. 5A-5B illustrate a method of automatically porting at least one current programming language package to a target operating system platform, according to one or more embodiments.
Figure 5B:
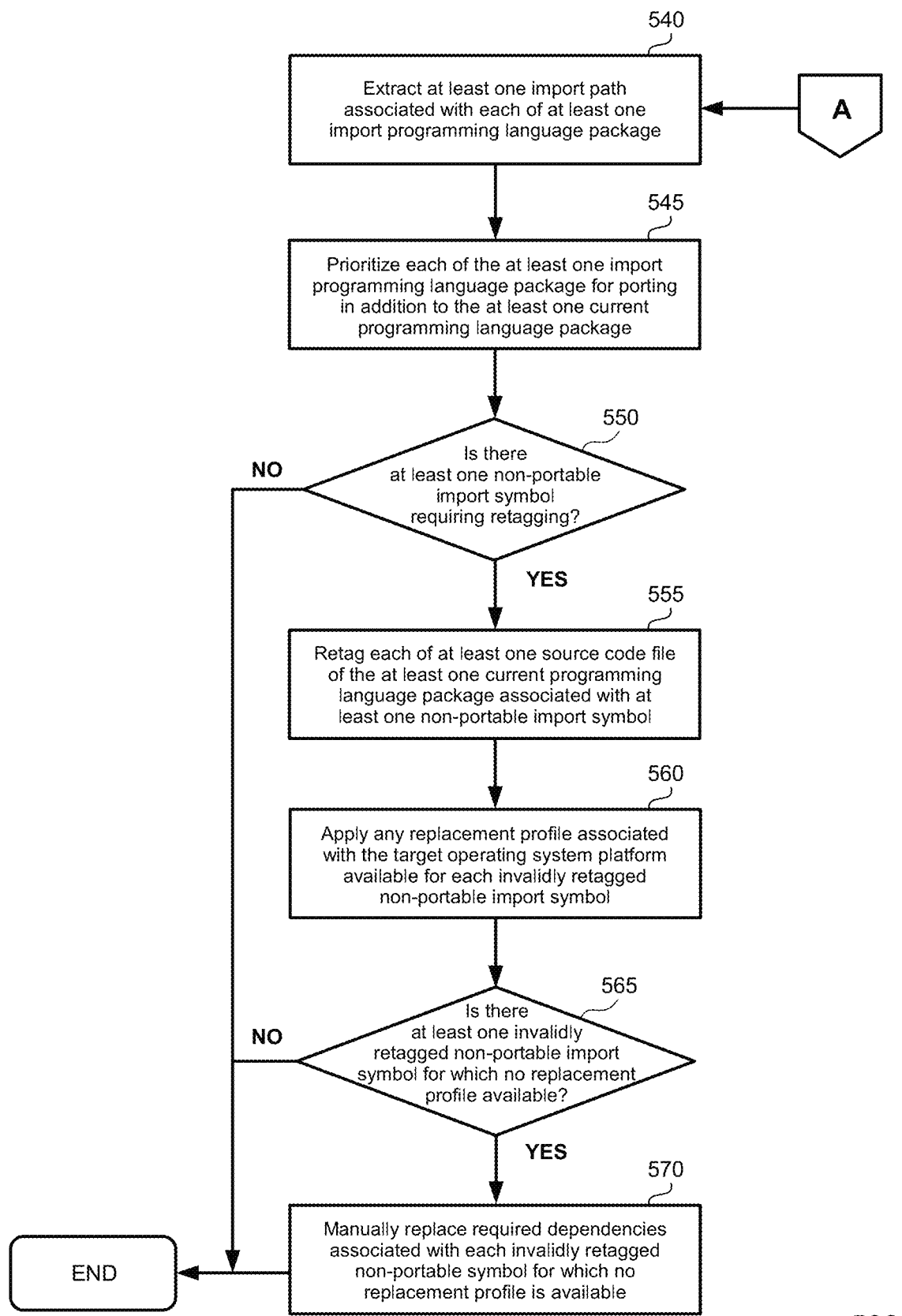

FIGS. 5A-5B illustrate a method 500 of automatically porting the at least one current programming language package to the target operating system platform. The method 500 provides one or more embodiments with respect to step 420 of the method 400. The method 500 begins at step 505, where the adaptation application determines whether there are multiple packages among the at least one current programming language package. Responsive to determining that there is only a single package among the at least one current programming language package, the adaptation application proceeds directly to step 515. Responsive to identifying multiple current programming language packages among the at least one current programming language package, at step 510 the adaptation application prioritizes the multiple current programming language packages for porting based upon a direct dependency hierarchy. For each of the multiple current programming language packages, the adaptation application assigns a porting priority according to rules reflective of direct dependency hierarchy prioritization. According to the direct dependency hierarchy, a first package among the multiple current programming language packages has priority over a second package among the multiple current programming language packages that is a direct dependency of the first package. In a scenario in which a second package that requires porting is a direct dependency of a first package that requires porting, the second package depends on the first package such that the second package includes or references one or more aspects of the first package. Therefore, per step 510 the adaptation application assigns a relatively higher priority to the first package and relatively lower priority to the second package. According to step 510, the adaptation application completes porting of packages among the at least one current programming language package in order of porting priority, such that the adaptation application ports respective packages among the multiple packages having higher porting priority prior to respective packages having lower porting priority. In an embodiment, the adaptation application stores priority information associated with the multiple packages in a dependency tree (e.g., dependency tree 240) reflective of the direct dependency hierarchy. The dependency tree is an acyclic directed tree conformant to the acyclic dependencies principle (ADP). In an embodiment, the adaptation application adds each of the at least one current programming language package to a porting queue (e.g., porting queue 280) in order of prioritization. In an embodiment alternative to the automatic porting process described according to step 420 and the method 500, the adaptation application prioritizes the multiple packages among the at least one current programming language package prior to porting in accordance with at least one special override porting module at step 425.

At step 515, the adaptation application updates to a latest version at least one owning module associated with the at least one current programming language package. In order to modify source code files among the at least one current programming language package associated with the at least one owning module, the adaptation application clones or updates such source code files from a module cache (e.g., module cache 290). In the context of the various embodiments, the module cache is a folder that contains downloaded programming language modules in a space that is protected relative to the target operating system platform. If a certain owning module among the at least one owning module is used for an initial time during the porting process, the adaptation application clones the certain owning module from the module cache to the at least one workspace folder associated with the target operating system platform. If a certain owning module among the at least one owning module previously was cloned from the module cache to the at least one workspace folder, the adaptation application transfers updates associated with the certain owning module from the module cache to the at least one workspace folder. In an embodiment, the adaptation application updates the at least one owning module by directly copying updated aspects of the at least one owning module from the module cache to the at least one workspace folder. The adaptation application accesses the at least one owning module from the at least one workspace folder in order to process porting tasks within the application porting workspace in accordance with the methods described herein.

At step 520, the adaptation application determines whether there is at least one export symbol among the at least one undefined symbol requiring retagging. In an embodiment, the adaptation application determines whether there is at least one export symbol requiring retagging based upon checking at least one data structure configured to store export symbol retagging information, e.g., based upon previous porting activity. Responsive to determining that there is no export symbol requiring retagging, the adaptation application proceeds directly to step 530. Responsive to determining that there is at least one export symbol requiring retagging, at step 525 the adaptation application retags each of at least one source code file of the at least one current programming language package associated with at least one export symbol among the at least one undefined symbol. The at least one export symbol is configured for export to at least one export programming language package dependent on the at least one current programming language package. According to step 525, the adaptation application retags each source code file of the at least one current programming language package that is associated with, i.e., that includes, one or more export symbols among the at least one export symbol. Per step 525, the adaptation application retags each of the at least one source code file by editing at least one build tag line associated with each of the at least one source code file. In the context of the various embodiments described herein, a build tag line is a line in a source code file including a build instruction with respect to one or more operating system platforms. A build tag line includes an instruction to build the source code file in which it is included on an enumerated listing of operating system platforms. Additionally or alternatively, a build tag line includes an instruction to exclude from build the source code file in which it is included on an enumerated listing of operating system platforms, e.g., by appending a logical NOT operator "!" before each operating system platform to be excluded from build. The adaptation application edits at least one build tag line in a source code file to indicate build compatibility with the target operation system platform responsive to confirming target operation system platform support for export symbol(s) included in the source code file, thus permitting the source code file to build on the target operating system platform. Conversely, the adaptation application edits at least one build tag line in a source code file to indicate no build compatibility with the target operation system platform responsive to confirming no target operation system platform support for export symbol(s) included in the source code file, thus excluding the source code file from any build configuration associated with the target operation system platform. Excluding the source code file results in filtering the source code file from any build configuration. Optionally, the adaptation application updates a platform map (e.g., platform map 230) to exclude the source code file from any build configuration. In the context of the various embodiments, the platform map associates at least one operating system platform, including the target operating system platform, with source code files presented to the programming language compiler. The adaptation application configures the platform map to reflect retagging actions taken with respect any validly parsed source code file associated with export symbol(s), local symbol(s), or import symbol(s) among the at least one undefined symbol. The adaptation application adds filters to the platform map at each retagging step associated with the method 500 in order to exclude one or more target operating system platform configurations from being built. Retagging in the context of step 525 requires no modification to the at least one source code file beyond build tag line editing.

In an embodiment, responsive to determining that mirroring functionality to the target operating system platform from at least one other operating system platform is required in order to complete retagging of each of the at least one source code file per step 525, the adaptation application further retags at least one supplemental source code file that does not include an export symbol but is necessary, respective to the retagging, for configuration of the target operating system platform in order to mirror the at least one other operating system platform. Mirroring the at least one other operating system platform to the target operating system platform is necessary when the at least one other operating system platform includes configuration information necessary to enable the target operating system platform to handle one or more export symbols among the at least one export symbol.

In an embodiment, responsive to determining that an export symbol among the at least one export symbol is associated with a standard programming language library package (e.g., a Go standard library package) and that the export symbol is not addressable in accordance with the standard programming library package, the adaptation application determines that the export symbol is not adaptable for porting, and accordingly the adaptation application marks as non-portable any source code file associated with the export symbol. Such non-portable marking mandates an exclusion from build of any source code file of an export programming language package that is associated with the export symbol. A method of retagging each of the at least one source code file of the at least one current programming language package associated with the at least one export symbol in accordance with step 525 is described with respect to FIG. 6.

At step 530, the adaptation application determines whether there is at least one local symbol among the at least one undefined symbol requiring retagging. In an embodiment, the adaptation application determines whether there is at least one local symbol requiring retagging based upon checking at least one data structure configured to store local symbol retagging information, e.g., based upon one or more local symbols affected by export symbol retagging and/or unaccounted for within the at least one current programming language package. Responsive to determining that there is no local symbol requiring retagging, the adaptation application proceeds directly to step 540. Responsive to determining that there is at least one local symbol requiring retagging, at step 535 the adaptation application retags each of at least one source code file of the at least one current programming language package associated with at least one local symbol among the at least one undefined symbol. Each source code file retagging associated with the at least one local symbol per step 535 meets any requirement associated with the at least one export symbol among the at least one undefined symbol. Retagging according to step 535 addresses local symbols, i.e., symbols internal to the at least one current programming language package. For example, retagging according to step 535 addresses a local symbol referenced in one package among the at least one current programming language package but missing from another package among the at least one current programming language package. According to step 535, the adaptation application retags each source code file of the at least one current programming language package that is associated with, i.e., that includes, one or more local symbols among the at least one local symbol. Per step 535, the adaptation application retags each of the at least one source code file by editing at least one build tag line associated with each of the at least one source code file. The adaptation application edits at least one build tag line in a source code file to indicate build compatibility with the target operation system platform responsive to confirming target operation system platform support for local symbol(s) included in the source code file, thus permitting the source code file to build on the target operating system platform. Conversely, the adaptation application edits at least one build tag line in a source code file to indicate no build compatibility with the target operation system platform responsive to confirming no target operation system platform support for local symbol(s) included in the source code file, thus excluding the source code file from any build configuration associated with the target operation system platform. Excluding the source code file results in filtering the source code file from any build configuration. Optionally, the adaptation application updates the platform map to exclude the source code file from any build configuration. Retagging in the context of step 535 requires no modification to the at least one source code file beyond build tag line editing.

In an embodiment, responsive to determining that mirroring functionality to the target operating system platform from at least one other operating system platform is required in order to complete retagging of each of the at least one source code file per step 535, the adaptation application further retags at least one supplemental source code file that does not include a local symbol but is necessary, respective to the retagging, for configuration of the target operating system platform in order to mirror the at least one other operating system platform. Mirroring the at least one other operating system platform to the target operating system platform is necessary when the at least one other operating system platform includes configuration information necessary to enable the target operating system platform to handle one or more local symbols among the at least one local symbol.

The adaptation application ensures that any local symbol-associated retagging completed according to step 535 does not adversely impact export symbol-associated retagging completed according to step 525 or other aspects associated with one or more of the at least one export symbol. In an embodiment, responsive to determining that the retagging associated with at least one local symbol per step 535 results in exclusion of an export symbol from one or more build configurations, the adaptation application determines that a requirement associated with the export symbol fails, and accordingly the adaptation application attempts to retag in order to address the export symbol. Responsive to determining that the export symbol cannot be included in the build configuration upon subsequent retagging, the adaptation application marks as non-portable the export symbol. Such non-portable marking mandates an exclusion from build of any source code file of an export programming language package that is associated with the export symbol.

At step 540, the adaptation application extracts at least one import path associated with each of at least one import programming language package on which the at least one current programming language package depends. According to step 540, the adaptation application extracts at least one import path from at least one source code file of the at least one current programming language package that includes at least one import symbol among the at least one undefined symbol. The at least one import symbol originates from the at least one import programming language package and thus is the basis of the dependency of the at least one current programming language package on the at least one import programming language package. Specifically, per step 540 the adaptation application identifies each import programming language package from which one or more import symbols among the at least one import symbol originate and, based upon the one or more import symbols, determines a dependency of the at least one current programming language package on the import programming language package.

In an embodiment, the adaptation application determines a full import path associated with an import programming language package per step 540 based upon a local name of the import programming language package within a source code file of the at least one current programming language package. Such source code file includes at least one import symbol referencing the import programming language package, i.e., at least one import symbol originating from the import programming language package. According to such embodiment, to extract the full import path, the adaptation application parses, via a programming language parsing library, the source code file into an abstract syntax tree (AST) format data structure. The programming language parsing library is a compilation library incorporated into the adaptation application. An example programming language parsing library is the Go AST parser library. Upon parsing the source code file, the adaptation application inspects an import definitions field of the AST format data structure to determine an import programming language package name that satisfies an import path naming convention and that relates to the local name of the import programming language package within the source code file.

At step 545, the adaptation application prioritizes each of the at least one import programming language package for porting in addition to the at least one current programming language package based upon the direct dependency hierarchy. Per step 545, the adaptation application identifies each import programming language package among the at least one import programming language package that is portable. For each portable import programming language package, the adaptation application assigns a porting priority according to rules reflective of direct dependency hierarchy prioritization. The adaptation application assigns a lower porting priority to each of the at least one current programming language package relative to each portable import programming language package, since package(s) among the at least one current programming language package depend on package(s) among the at least one import programming language package. Accordingly, the adaptation application attempts to port each portable import programming language package prior to porting any package among the at least one current programming language package. According to step 545, responsive to identifying a single import programming language package among the at least one import programming language package, the adaptation application prioritizes the single import programming language package over the at least one current programming language package. Responsive to identifying multiple import programming language packages among the at least one import programming language package, the adaptation application prioritizes the respective multiple import programming language packages and further prioritizes each of the multiple import programming language packages over the at least one current programming language package. In a related embodiment, upon prioritizing each portable import programming language package, the adaptation application halts porting of the at least one current programming language package and proceeds to port or otherwise adapt each portable import programming language package in order of priority according to steps described in the method 400, the method 500, and related methods. According to such related embodiment, the adaptation application resumes porting of the at least one current programming language package subsequent to completion of all method steps associated with each portable import programming language package.

In an embodiment, the adaptation application stores priority information associated with each portable import programming language package in a dependency tree reflective of the direct dependency hierarchy. The dependency tree storing the import programming language package priority information is an acyclic directed tree conformant to the ADP. Optionally, the dependency tree storing the import programming language package priority information is a subcomponent or a branch of the dependency tree previously described in the context of step 510 with respect to prioritization of multiple packages among the at least one current programming language package. According to step 545, the adaptation application marks for porting each portable import programming language package and adds each portable import programming language package to the porting queue in order of prioritization along with the at least one current programming language package. In accordance with an embodiment in which priority information is stored in a dependency tree, the adaptation application adds each portable import programming language package to the porting queue based upon the dependency tree.

At step 550, the adaptation application determines whether there is at least one non-portable import symbol requiring retagging. According to step 550, the responsive to determining that no valid porting solution is found with respect to an import programming language package among the at least one import programming language package, the adaptation application identifies such import programming language package as a non-portable import programming language package and further identifies any import symbol among the at least one import symbol originating from such non-portable import programming language package as a non-portable import symbol requiring retagging. The adaptation application proceeds to one or more subsequent steps of the method 500 to resolve any non-portable import symbol associated with such non-portable import programming language package. Conversely, responsive to determining that each import symbol among the at least one import symbol is addressed adequately through import programming language package porting per step 545, the adaptation application determines that there is no non-portable import symbol requiring retagging and thus proceeds directly to the end of the method 500.

At step 555, the adaptation application retags each of at least one source code file of the at least one current programming language package associated with at least one non-portable import symbol among the at least one import symbol. The adaptation application identifies each of the at least one non-portable import symbol based upon corresponding import path among the extracted at least one import path. Each non-portable import symbol is associated with one or more non-portable import programming language packages among the at least one import programming language package. Accordingly, each non-portable import symbol is identified based upon association with one or more import programming language packages unsuccessfully ported in accordance with requirements of the at least one current programming language package. According to step 555, the adaptation application retags each source code file of the at least one current programming language package that is associated with, i.e., that includes, one or more non-portable import symbols among the at least one import symbol. In an embodiment, per step 555 the adaptation application retags each of the at least one source code file by excluding each of the at least one source code file associated with at least one non-portable import symbol from any build configuration associated with the target operating system platform. According to such embodiment, optionally the adaptation updates the platform map to exclude each of the at least one source code file from any build configuration associated with the target operating system platform. In an additional embodiment, per step 555 the adaptation application edits at least one build tag line in each of the at least one source code file to explicitly exclude the source code file from any build configuration associated with the target operating system platform, e.g., via inclusion of the logical NOT operator in association with the target operating system platform within the at least one build tag line.

In an embodiment, responsive to determining that a non-portable import symbol among the at least one non-portable import symbol is associated with a standard programming language library package and that the non-portable import symbol is not addressable in accordance with the standard programming library package, the adaptation application determines that the non-portable import symbol is not adaptable for porting, and accordingly per step 555 the adaptation application retags for exclusion from build any source code file associated with the non-portable import symbol. In an additional embodiment, per step 555 the adaptation application propagates to any export symbol among the at least one export symbol any modification associated with the at least one non-portable import symbol that impacts any such export symbol. According to such additional embodiment, responsive to determining that an export symbol among the at least one export symbol includes a reference to or otherwise is impacted by a retagging modification related to a non-portable import symbol, the adaptation application applies an analogous modification with respect to the export symbol.

At step 560, the adaptation application applies any replacement profile associated with the target operating system platform available for each invalidly retagged non-portable import symbol among the at least one non-portable import symbol. An invalidly retagged non-portable import symbol is a non-portable import symbol for which retagging according to step 555 results in error. An invalid retagging associated with a non-portable import symbol occurs when the adaptation application attempts to filter from any build configuration at least one source code file including at least one non-portable import symbol among at least one non-portable import symbol, but such exclusion results in a local symbol error and/or an export symbol error. A replacement profile for a non-portable import symbol replaces dependencies associated with the non-portable import symbol which are required for proper function of the at least one current programming language package on the target operating system platform. A replacement profile for a non-portable import symbol includes a package identifier having a package import path, a profile symbol to be imported by the at least one current programming language package (i.e., the symbol imported by any dependent package applying the profile), and instructions regarding replacement of the non-portable import symbol with the profile symbol.

At step 565, the adaptation application determines whether there is at least one invalidly retagged non-portable import symbol among the at least one non-portable import symbol for which no replacement profile is available. Responsive to determining that there is no invalidly retagged non-portable import symbol among the at least one non-portable import symbol for which no replacement profile is available, i.e., the adaptation application applies a replacement profile for each invalidly retagged non-portable import symbol per step 560, the adaptation application proceeds directly to the end of the method 500. Responsive to determining that there is at least one invalidly retagged non-portable import symbol among the at least one non-portable import symbol for which no replacement profile is available, at step 570 the adaptation application manually replaces required dependencies that are associated with each invalidly retagged non-portable import symbol among the at least one non-portable import symbol for which no replacement profile is available. The required dependencies manually replaced per step 570 are dependencies associated with each invalidly retagged non-portable import symbol which are required for proper function of the at least one current programming language package on the target operating system platform. In an embodiment, the adaptation application manually replaces the required dependencies via hard coding. In an additional embodiment, the adaptation application manually replaces the required dependencies by consulting network resources, e.g., by applying alternative code elements from external sources that address dependency errors associated with the invalidly retagged non-portable import symbol. In a further embodiment, adaptation application manually replaces the required dependencies via consultation of a community port that includes at least one known porting element associated with the invalidly retagged non-portable import symbol.

In an embodiment, the adaptation application completes a clone to workspace (CTW) operation or a module workspace update operation with respect to each owning module among the at least one owning module including at least one source code file of the at least one current programming language package that requires modification consequent to porting activity. According to such embodiment, the adaptation application completes a CTW operation or a module workspace update operation during each step of the method 500 requiring modification of at least one source code file of the at least one current programming language package. For instance, a CTW operation or a module workspace update operation is necessary in order to edit a build tag line in the context of retagging steps 525, 535, and 555. In another instance, a CTW operation or a module workspace update operation is necessary in order to apply a replacement profile in the context of step 560. In the context of the various embodiments, the adaptation application completes a CTW operation by cloning from the module cache to the at least one workspace folder each relevant owning module among the at least one owning module prior to modifying one or more of the at least one source code file in the application porting workspace. Completion of a CTW operation or module workspace update operation permits the adaptation application to perform porting operations upon the at least one owning module within the application porting workspace without modifying the protected module cache.

Figure 6:
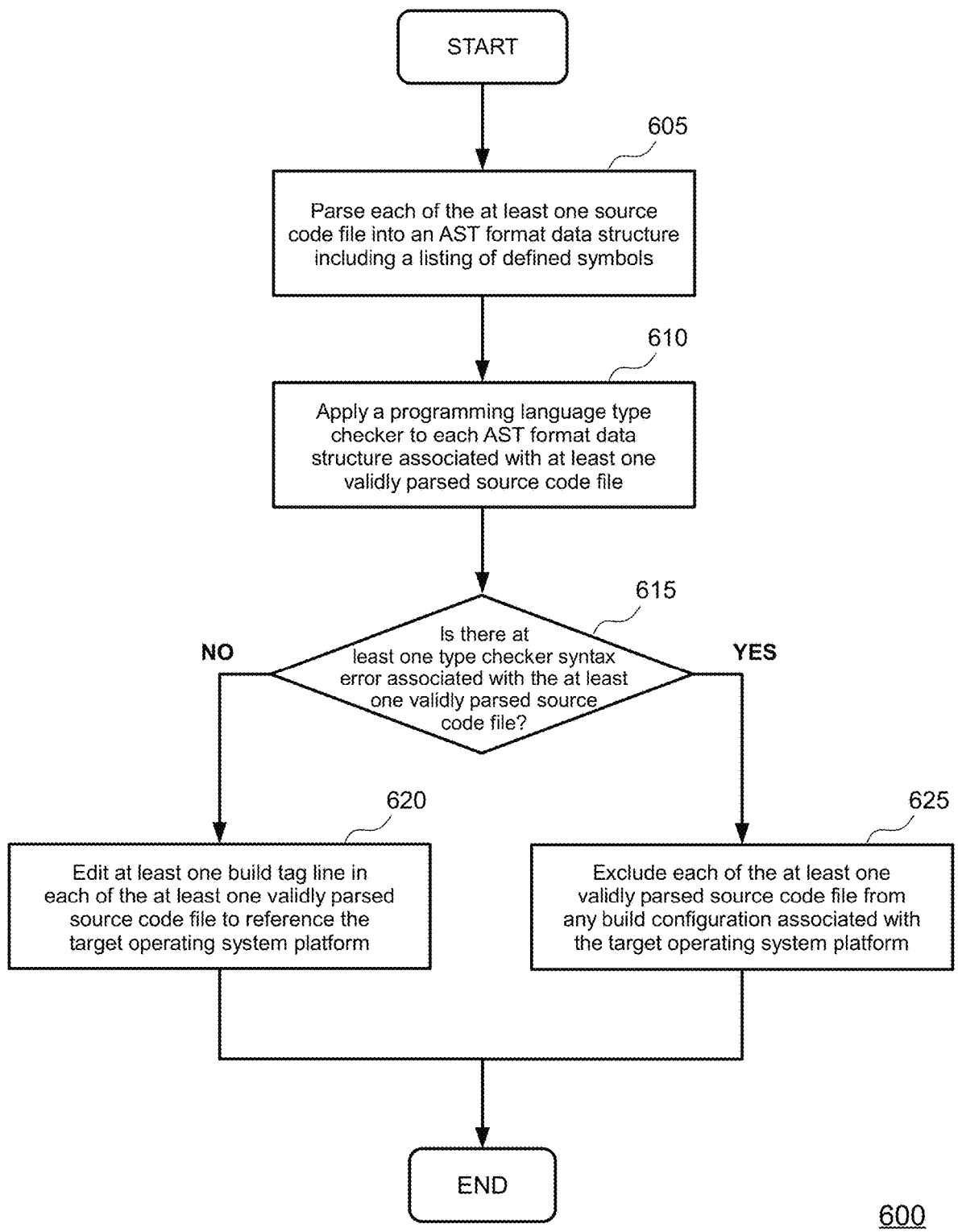
FIG. 6 illustrates a method of retagging each of at least one source code file of at least one current programming language package associated with at least one export symbol among at least one undefined symbol, according to one or more embodiments.

FIG. 6 illustrates a method 600 of retagging each of the at least one source code file of the at least one current programming language package associated with the at least one export symbol. According to the method 600, the adaptation application retags each of the at least one source code file associated with one or more export symbols among the at least one export symbol. The method 600 provides one or more embodiments with respect to step 525 of the method 500. The method 600 begins at step 605, where the adaptation application parses each of the at least one source code file into an AST format data structure including a listing of defined symbols. The adaptation application parses according to step 605 via the programming language parsing library previously discussed. While the adaptation application parses an overall source code file, the listing of defined symbols references each export symbol among the at least one export symbol associated with the source code file. Responsive to determining that a source code file among the at least one source code file is invalidly parsed, the adaptation application marks any build configuration including the invalidly parsed source code file as unresolvable via retagging. The adaptation application proceeds with subsequent steps of the method 600 only for validly parsed source code files among the at least one source code file.

At step 610, the adaptation application applies a programming language type checker to each AST format data structure associated with at least one validly parsed source code file among the at least one source code file. The adaptation application applies the type checker per step 610 in order to determine whether the at least one validly parsed source code file is supported by the target operating system platform. In the context of the various embodiments, the type checker is a layer of compiler functionality that associates source code files with compatible operating system platforms. In an embodiment, the type checker associates a certain source code file with operating system platforms in least in part based upon any build tag line included in the certain source code file. According to step 610, the adaptation application applies the type checker to each AST format data structure parsed per step 605 that corresponds to a validly parsed source code file among the at least one validly parsed source code file. In an additional embodiment, the adaptation application applies the type checker by analyzing the listing(s) of defined symbols included in each AST format data structure. In a related embodiment, the adaptation application iterates through each AST format data structure to compare the listing(s) of defined symbols with data that associates symbols with operating system platforms. In a further embodiment, in the event that the adaptation application applies the type checker to multiple AST format data structures at step 610, the adaptation application applies the type checker only to a subset of the multiple AST format data structures relevant to one or more build configurations associated with the target operating system platform.

At step 615, the adaptation application determines whether there is at least one type checker syntax error associated with the at least one validly parsed source code file. Responsive to determining no type checker syntax error associated with the at least one validly parsed source code file, at step 620 the adaptation application edits at least one build tag line in each of the at least one validly parsed source code file to reference the target operating system platform. In an embodiment, per step 620 the adaptation application determines that one or more export symbols among the at least one export symbol are defined in a source code file among the at least one validly parsed source code file and consequently edits at least one build tag line in the source code file such that the source code file builds on the target operating system platform. In an additional embodiment, per step 620 the adaptation application determines that one or more export symbols among the at least one export symbol are analogous to one or more other symbols defined in a source code file among the at least one validly parsed source code file and consequently edits at least one build tag line in the source code file so that the source code file builds on the target operating system platform. In a related embodiment, the adaptation application updates the platform map to reflect inclusion of the source code file in one or more build configurations associated with the target operating system platform.

Responsive to determining at least one type checker syntax error associated with the at least one validly parsed source code file, at step 625 the adaptation application excludes each of the at least one validly parsed source code file from any build configuration associated with the target operating system platform. In an embodiment, the at least one type checker syntax error relates to at least one missing element expected by the type checker. In an embodiment, the adaptation application excludes each of the at least one validly parsed source code file per step 625 by editing at least one build tag line in each of the at least one validly parsed source code file to explicitly exclude the target operating system platform from any build configuration associated with the target operating system platform, e.g., by editing the at least one build tag line to include a logical NOT operator in association with the target operating system platform. In an additional embodiment, the adaptation application excludes each of the at least one validly parsed source code file per step 625 by updating the platform map to reflect such exclusion. According to such additional embodiment, the adaptation application applies a platform map filter with respect to each of the at least one validly parsed source code file in association with the target operating system platform.

In an embodiment, the adaptation application applies one or more steps of the method 600 in order to retag each of the at least one source code file of the at least one current programming language package associated with the at least one local symbol, thus providing one or more embodiments with respect to step 535 of the method 500. The steps of the method 600 are applicable to retagging associated with at least one local symbol in the context of step 535 in addition to retagging associated with at least one export symbol in the context of step 525. According to such embodiment, actions taken by the adaptation application with respect to export symbol(s) and source code file(s) associated with such export symbol(s) in the context of the method 600 instead are taken with respect to local symbol(s) and source code file(s) associated with such local symbol(s), while addressing any impact to export symbol(s) and source code file(s) associated with such export symbol(s) consequent to the local symbol actions.

Figure 7:
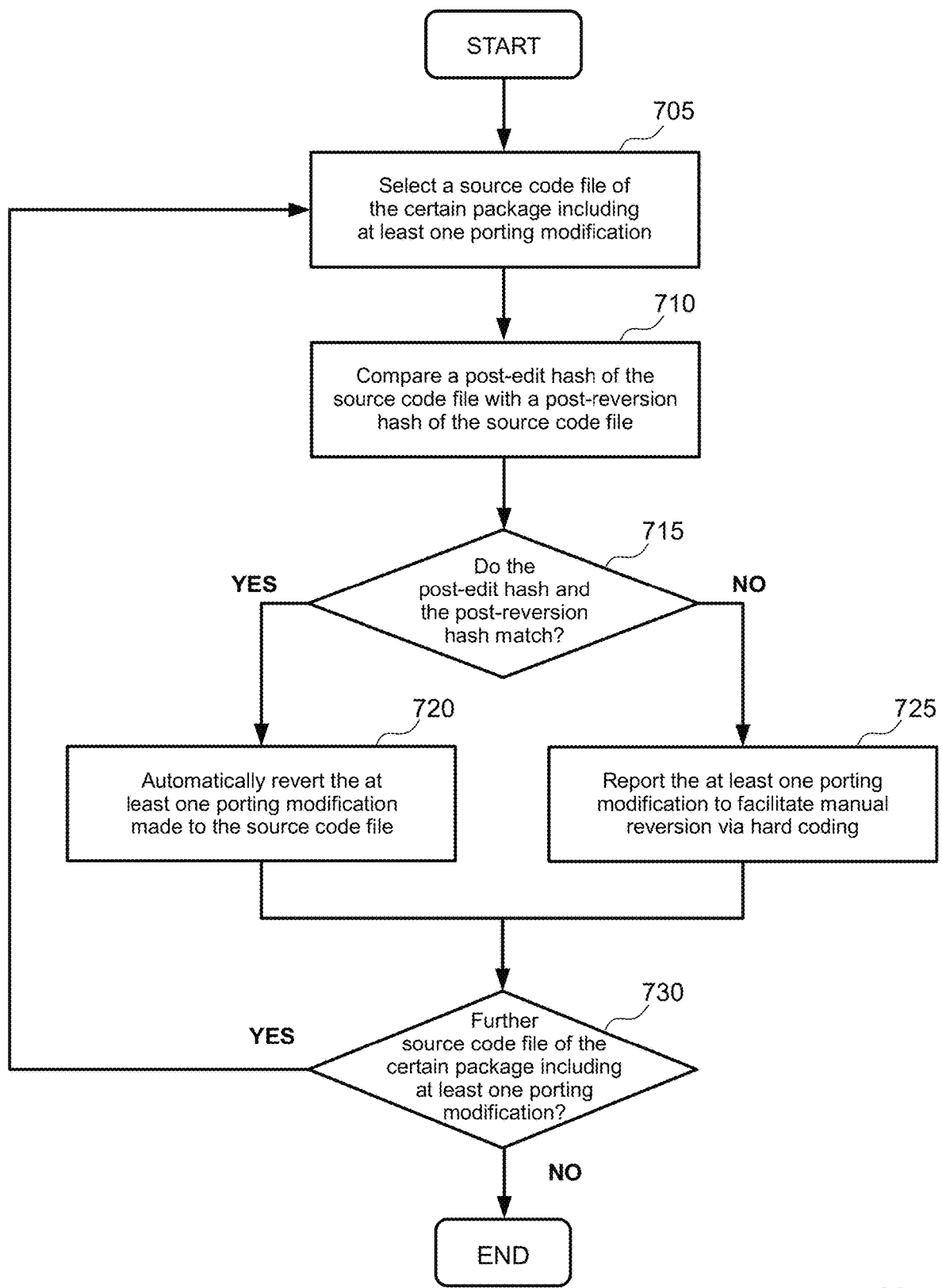
FIG. 7 illustrates a method of un-porting a certain package among at least one current programming language package, according to one or more embodiments.

FIG. 7 illustrates a method 700 of un-porting a certain package among the at least one current programming language package. The method 700 provides one or more embodiments with respect to step 440 of the method 400. The adaptation application executes applicable steps of the method 700 for each source code file of the certain package including at least one porting modification, e.g., made consequent to porting the at least one current programming language package per step 420 or per step 425. The method 700 begins at step 705, where the adaptation application selects a source code file of the certain package including at least one porting modification. At step 710, the adaptation application compares a post-edit hash of the source code file completed subsequent to porting with a post-reversion hash of the source code file completed subsequent to attempting an operation to revert the at least one porting modification, i.e., a revert changes operation. In an embodiment, the adaptation application retrieves the post-edit hash information from an action database associated with the certain package. In an embodiment, the adaptation application retrieves information related to the at least one porting modification from the action database associated with the certain package.

At step 715, consequent to comparative analysis at step 710, the adaptation application determines whether the post-edit hash and the post-reversion hash match. Responsive to determining that the post-edit hash and the post-reversion hash match, at step 720 the adaptation application automatically reverts the at least one porting modification made to the source code file. In an embodiment, the adaptation application automatically reverts the at least one porting modification by applying reverting changes based upon information retrieved for the source code file from the action database associated with the certain package. In an additional embodiment, the adaptation application sends a porting reversion notification regarding the source code file to the at least one user application interface associated with the adaptation application. Responsive to determining that the post-edit hash and the post-reversion hash do not match, at step 725 the adaptation application reports the at least one porting modification in order to facilitate manual reversion via hard coding. In an embodiment, reporting the at least one porting modification includes providing a porting change listing to the at least one user application interface. In a related embodiment, the adaptation application obtains the at least one porting modification for reporting based upon action database information retrieved for the source code file.

At step 730, the adaptation application determines whether there is a further source code file of the certain package including at least one porting modification yet to be selected in the context of the method 700. Responsive to determining that there is a further source code file of the certain package including at least one porting modification, the adaptation application returns to step 705 to repeat the un-porting steps with respect to the further source code file. Responsive to determining that there is no further source code file of the certain package including at least one porting modification, the adaptation application proceeds to the end of the method 700. According to the method 700, the adaptation application processes only source code files of the certain package including at least one porting modification consequent to porting the at least one current programming language package.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method comprising:
   receiving, by one or more processors, a build parsing error consequent to compiling a current programming language package on a target operating system platform;
   responsive to determining that there is no special override porting module corresponding to the current programming language package:
     retagging, by one or more processors, a file associated with an undefined symbol among the build parsing error; and
     automatically porting, by one or more processors, the current programming language package to the target operating system platform; and
   configuring, by one or more processors, a database associated with the current programming language package, wherein the database comprises pre-edit hashes of source code files, post-edit hashes of source code files, and a listing of other packages ported.

2. The computer-implemented method of claim 1, wherein;
the current programming language package comprises multiple current programming language packages; and
automatically porting the current programming language package to the target operating system platform comprises:
responsive to identifying the multiple current programming language packages prioritizing, by one or more processor, the multiple current programming language packages for porting based upon a direct dependency hierarchy.

3. The computer-implemented method of claim 1, wherein automatically porting the current programming language package to the target operating system platform comprises:
updating, by one or more processors, to a latest version, an owning module associated with the current programming language package.

4. The computer-implemented method of claim 3, wherein a selection from a group consisting of: (i) a clone to workspace (CTW) operation and (ii) a module workspace update operation, is completed with respect to the owning module including at least one source code file of the current programming language package that requires modification consequent to porting activity.

5. The computer-implemented method of claim 1, wherein automatically porting the current programming language package to the target operating system platform comprises:
retagging, by one or more processors, each source code file of the current programming language package associated with an export symbol among the undefined symbol, wherein the export symbol is configured for export to an export programming language package dependent on the current programming language package.

6. The computer-implemented method of claim 5, wherein automatically porting the current programming language package to the target operating system platform further comprises:
retagging, by one or more processors, each source code file of the current programming language package associated with a local symbol among the undefined symbol, wherein each source code file retagging associated with the local symbol meets any requirement associated with the export symbol.

7. The computer-implemented method of claim 5, wherein retagging each source code file of the current programming language package associated with the export symbol comprises:
parsing, by one or more processors, via a programming language parsing library, each source code file into an abstract syntax tree (AST) format data structure including a listing of defined symbols;
applying, by one or more processors, a programming language type checker to each AST format data structure associated with at least one validly parsed source code file;
responsive to determining no type checker syntax error associated with the at least one validly parsed source code file, editing, by one or more processors, a build tag line in each of the at least one validly parsed source code file to reference the target operating system platform; and
responsive to determining a type checker syntax error associated with the at least one validly parsed source code file, excluding, by one or more processors, each of the at least one validly parsed source code file from any build configuration associated with the target operating system platform.

8. The computer-implemented method of claim 1, wherein automatically porting the current programming language package to the target operating system platform comprises:
extracting, by one or more processors, an import path associated with each import programming language package on which the current programming language package depends, wherein the import path is extracted from a source code file of the current programming language package that includes an import symbol among the undefined symbol originating from the import programming language package.

9. The computer-implemented method of claim 8, wherein automatically porting the current programming language package to the target operating system platform further comprises:
prioritizing, by one or more processors, the import programming language package for porting in addition to the current programming language package based upon a direct dependency hierarchy.

10. The computer-implemented method of claim 9, wherein automatically porting the current programming language package to the target operating system platform further comprises:
retagging, by one or more processors, each source code file of the current programming language package associated with a non-portable import symbol among the import symbol, wherein the non-portable import symbol is identified based upon a corresponding import path among the extracted import path.

11. The computer-implemented method of claim 10, wherein automatically porting the current programming language package to the target operating system platform further comprises:
applying, by one or more processors, any replacement profile associated with the target operating system platform available for each invalidly retagged non-portable import symbol among the non-portable import symbol.

12. The computer-implemented method of claim 11, wherein automatically porting the current programming language package to the target operating system platform further comprises:
manually replacing, by one or more processors, required dependencies that are associated with each invalidly retagged non-portable import symbol among the non-portable import symbol for which no replacement profile is available.

13. The computer-implemented method of claim 1, further comprising:
downloading, by one or more processors, a tool module associated with the current programming language package via a programming language technique associated with tool installation, and importing the tool module to the target operating system platform.

14. The computer-implemented method of claim 1, wherein:
the database is an action database;
the action database is of a certain package among the current programming language package;
the pre-edit hashes of source code files are of the certain package;

the post-edit hashes of source code files are respective post-edit hashes of source code files of the certain package; and the listing of other packages ported is a listing of other packages ported consequent to porting the certain package.

15. The computer-implemented method of claim 1, further comprising:

responsive to receiving a user application interface command requesting porting analysis with respect to a certain package among the current programming language package, initializing, by one or more processors, an interactive mode in order to display to at least one user application interface any porting modification made to the certain package and any alternative porting option.

16. The computer-implemented method of claim 1, further comprising:

responsive to determining that at least one manual code change is required for a certain package among the current programming language package, un-porting, by one or more processors, the certain package.

17. The computer-implemented method of claim 16, wherein un-porting the certain package comprises:

for each source code file of the certain package including at least one porting modification:

comparing, by one or more processors, a post-edit hash of the source code file completed subsequent to porting with a post-reversion hash of the source code file completed subsequent to attempting an operation to revert the at least one porting modification; and performing, by one or more processors, a selection from a group consisting of: (i) responsive to determining a match between the post-edit hash and the post-reversion hash, automatically reverting the at least one porting modification made to the source code file and (ii) responsive to determining that the post-edit hash and the post-reversion hash do not match, reporting the at least one porting modification in order to facilitate manual reversion via hard coding.

18. A computer program product comprising:

one or more computer readable storage media; and program instructions stored on the one or more computer readable storage media to perform operations comprising:

receiving a build parsing error consequent to compiling a current programming language package on a target operating system platform;

responsive to determining that there is no special override porting module corresponding to the current programming language package:

retagging a file associated with an undefined symbol among the build parsing error; and automatically porting the current programming language package to the target operating system platform; and configuring a database associated with the current programming language package, wherein the database comprises pre-edit hashes of source code files, post-edit hashes of source code files, and a listing of other packages ported.

19. A computer system comprising:

a processor set;

one or more computer readable storage media; and program instructions stored on the one or more computer readable storage media to cause the processor set to perform operations comprising:

receiving a build parsing error consequent to compiling a current programming language package on a target operating system platform;

responsive to determining that there is no special override porting module corresponding to the current programming language package:

retagging a file associated with an undefined symbol among the build parsing error; and automatically porting the current programming language package to the target operating system platform; and configuring a database associated with the current programming language package, wherein the database comprises pre-edit hashes of source code files, post-edit hashes of source code files, and a listing of other packages ported.

* * * * *